June 21, 1955
I. W. FRITZ
2,711,329
LIFTING TRAILER
Filed Sept. 8, 1954
2 Sheets-Sheet 1
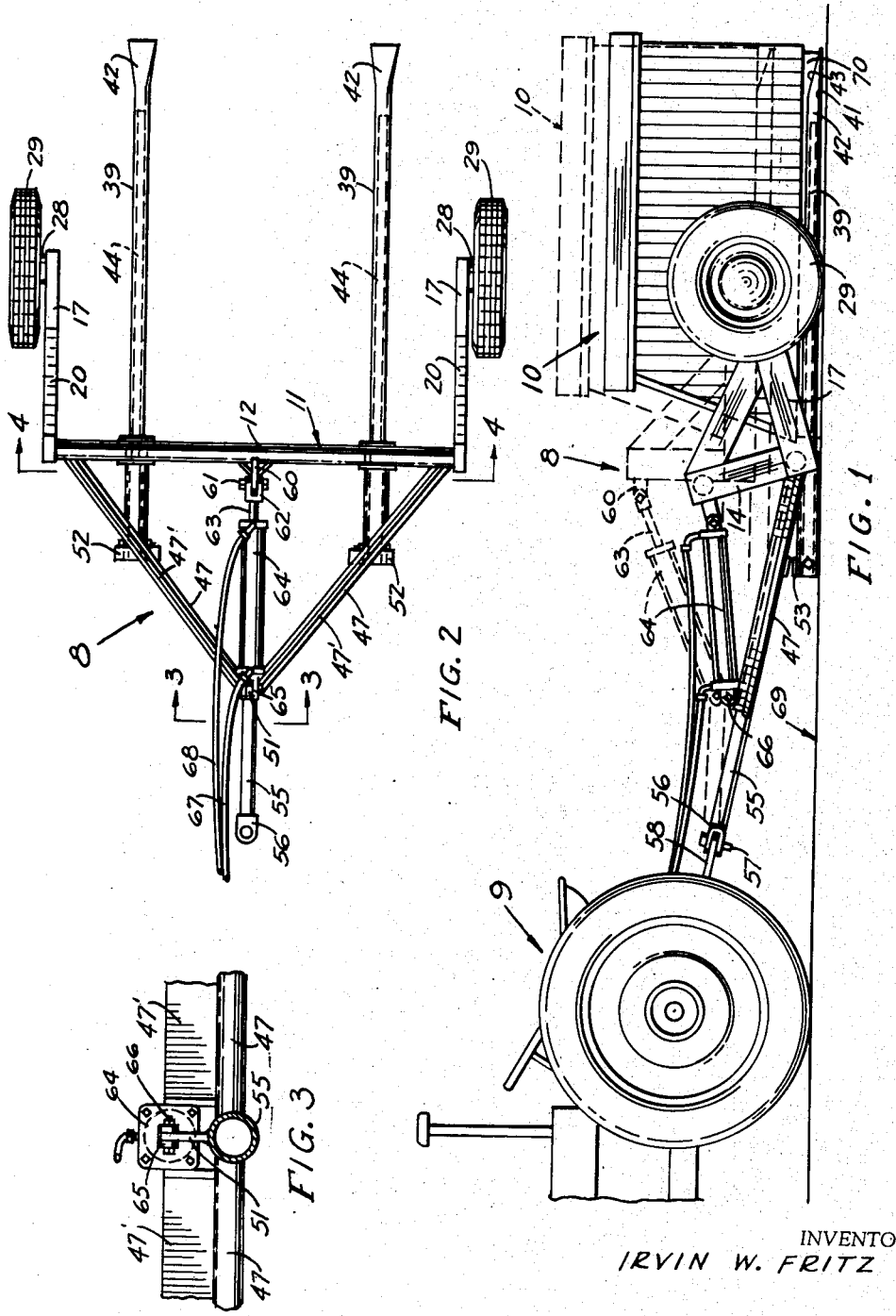
INVENTOR
IRVIN W. FRITZ
BY
McMorrow, Berman & Davidson
ATTORNEYS June 21, 1955     I. W. FRITZ     2,711,329
LIFTING TRAILER Filed Sept. 8, 1954     2 Sheets-Sheet 2

INVENTOR
IRVIN W. FRITZ
BY McMorrow, Berman + Davidson
ATTORNEYS

United States Patent Office 2,711,329
Patented June 21, 1955

2,711,329

LIFTING TRAILER

Irvin W. Fritz, Springfield Township, Franklin County, Ind.

Application September 8, 1954, Serial No. 454,794

5 Claims. (Cl. 280—44)

This invention relates to improvements in trailers having vertically movable bodies, and more particularly to an improved trailer of this kind, especially but not exclusively, for lifting and moving and replacing such as hog houses and associated objects, and to be operated by a farm or other tractor.

The primary object of the invention is to provide a more efficient and more practical device of the character indicated above which is of simple construction, and which is easily attached to and detachable from an ordinary tractor; and which is capable of being easily and accurately operated entirely from a tractor without requiring the operator to leave the tractor.

Another important object of the invention is to provide a device of the character indicated above which functions to lift such as a hog house, with its inmates, off the ground without damage to the hog house or the ground, transport the lifted hog house to a new site, and deposit the hog house thereon without damage to the hog house or harm to the inmates thereof; and which can be provided with a removable platform enabling the transporting of objects other than hog houses.

Other important objects and advantageous features of the invention will be apparent from the following description and the accompanying drawings, wherein, for purposes of illustration only, a specific form of the invention is set forth in detail.

Figure 1 is a right hand side elevation of said form, showing the body in depressed position in full lines and elevated position in phantom lines, with a hog house upon the body; and connected to a tractor;

Figure 2 is a top plan view with the hog house removed;

Figure 3 is an enlarged fragmentary transverse vertical section taken on the line 3—3 of Figure 2;

Figure 4:
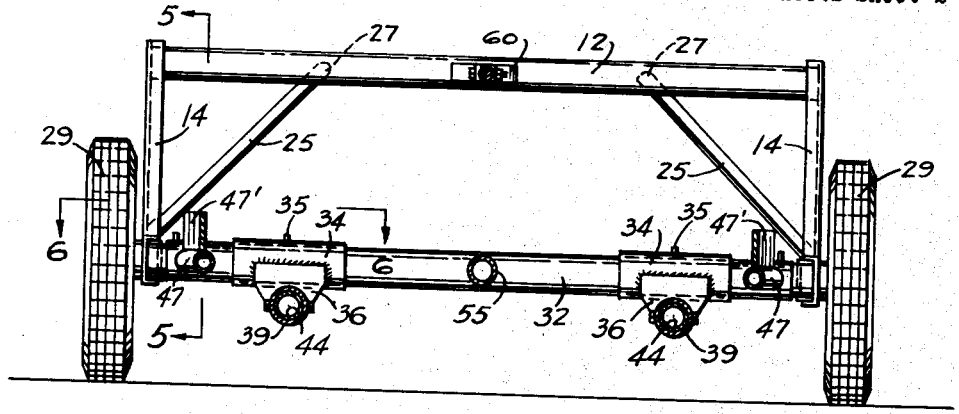
Figure 4 is an enlarged transverse vertical section taken on the line 4—4 of Figure 2.
Figure 5:
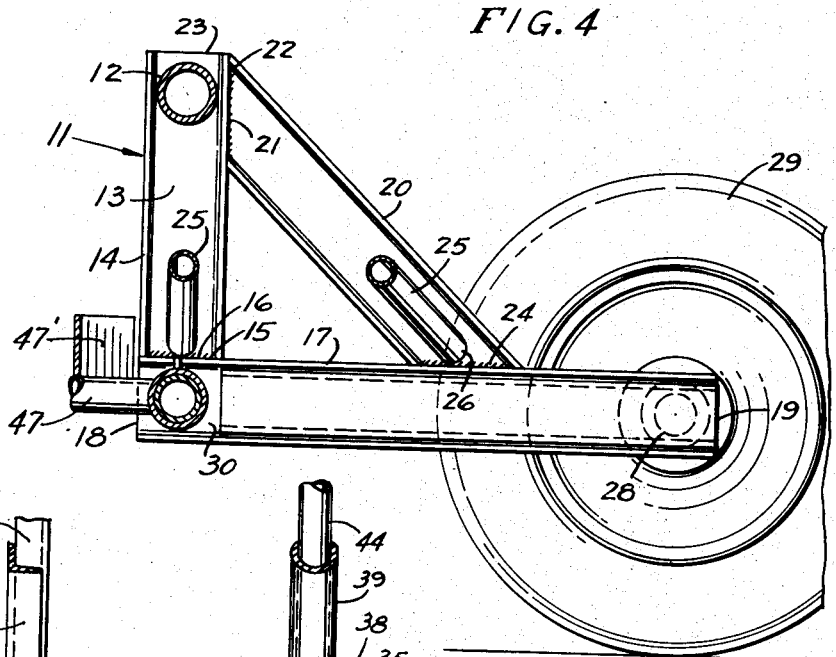
Figure 5 is a further enlarged fragmentary vertical longitudinal section taken on the line 5—5 of Figure 4.

Referring in detail to the drawings, wherein like numerals designate like parts throughout the several views, the illustrated trailer, generally designated 8, is shown connected to a tractor 9, and in lifting and carrying relation to a hog house 10.

The trailer 8 comprises a body frame 11 which comprises an upper horizontal transverse cross member 12, preferably in the form of a heavy pipe, on whose ends are secured, as by welding, to the webs 13 of vertical, depending channel irons 14 having lower ends 15 secured, as by welding 16, to the upper sides of horizontal longitudinal, rearwardly extending horizontal channel irons 17, at the forward ends 18 of the channel irons 17 which have rear ends 19.

Rearwardly declining diagonal braces 20, preferably in the form of channel irons, are secured as by welding 21 at their upper ends 22 to the rear sides at the upper ends 23 of the vertical channel irons 14, and by welding 24 to the upper sides of the longitudinal channel irons 17 at points spaced from the forward and rearward ends of the channel irons 17.

Forwardly and laterally inwardly angulated braces 25, preferably in the form of pipes, are fixed at their lower ends, as indicated at 26, to the depressed rear ends of the braces 20, and the upper ends of the braces 25 are fixed to the transverse cross member 12 at points spaced from the ends of the member 12, as indicated at 27.

On and projecting laterally outwardly from the rear ends 19 of the longitudinal channel irons 17 are stub axles 28 on which are journaled preferably rubber tired ground-engaging wheels 29.

Secured to the webs 30 of the longitudinal channel irons 17 at the forward ends 18 of the latter, as indicated at 30', are the opposite ends of a stationary transverse shaft 31, preferably of heavy pipe, and rotatably circumposed upon the shaft 31 is a rotating shaft 32 having ends 33 spaced from the longitudinal channel irons 17.

Two sleeves 34, equally spaced from the shaft ends 33 and from each other are circumposed upon the rotatable shaft 32 and are pinned thereto, as indicated at 35, to turn with the shaft 32, and front and rear ears 36 and 37, respectively, depend from the sleeves 34, below the shaft 32.

Longitudinal sleeves 38 extend between and are secured to the ears 36 and 37 below the shaft 32, and parallel tubular lifting arms 39 extend through the sleeves 38. The arms 39 have forward ends 40 located forwardly of the shaft 32 and rear ends 41 located behind the ground engaging wheels 29. The said rear ends 41 terminate in rearwardly flaring wedges 42 which have rearwardly declining ramp surfaces 43.

Stiffening tubes 44 extend through the tubular arms 39 and have forward ends 45 pinned, as indicated at 46, to the forward ends 40 of the arms 39.

Forward and laterally inwardly angled tubular draft arms 47 are secured at their rear ends, as indicated at 48, to sleeves 49 circumposed on and pinned, as indicated at 50, to the transverse shaft 32 as the ends 33 of the shaft 32, and the forward ends of the draft arms 47 are secured together and to a vertical lug 51. At points intermediate the ends of the arms 47 stop plates 52 are secured to the undersides of the arms 47 in such position that the plates 52 can engage and rest upon rest plates 53 secured, as indicated at 54, to the upper sides of the forward ends of the tubular arms 39, in the depressed position of the trailer body. The draft arms 47 are braced by vertical plates 47' extending along their upper sides.

A forwardly projecting drawbar 55 has a clevis 56 on its forward end and is rigidly fixed at its rear end to the forward ends of the draft arms 47 at their point of connection with each other, the clevis 56 being adapted to be pivotally connected by a vertical pin 57 to the drawbar 58 of a tractor 9. The rear end of the drawbar 55 is secured to the shaft 32.

Fixed at the center of the transverse frame cross member 12 and projecting forwardly therefrom is a bracket 60, to which is horizontally pivoted, as indicated at 61, a clevis 62 on the rear end of the piston 63 of a hydraulic cylinder 64. The forward end of the cylinder has a clevis 65 pivoted horizontally as indicated at 65 to the lug 51. Hydraulic lines 67 and 68 lead from forward and rearward parts of the cylinder 64 to hydraulic control means on the tractor 59, whereby the piston rod 63 can be, at the will of the operator of the tractor, extended to depress the lifting arms 39 into contact with the ground 69, as shown in full lines in Figure 1, or contracted into the cylinder 64 to elevate the arms 39 into an elevated position, shown in phantom lines in Figure 1, with the arms 39 at a slight forward downtilt to preclude rearward sliding off the arms 39 of a hog house 10 or the like loaded thereon.

Figure 6:
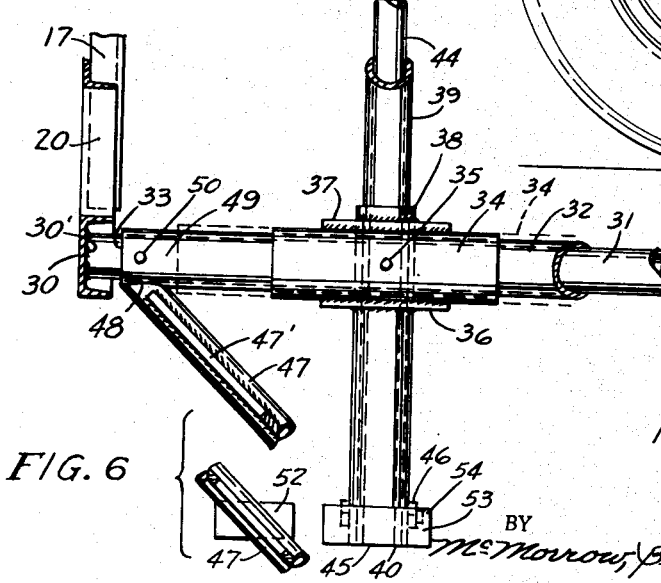
Figure 6 is a similarly enlarged and contracted fragmentary section taken on the line 6—6 of Figure 4.

As indicated in Figure 6, the sleeves 34 are slidable on the shaft 32, so as to adjust the lifting arms 39 crosswise of the frame 11 to accommodate loads of different widths, and to place the lifting arms 39 at the outer sides of the skids 70 on the underside of a hog house 10, and thereby prevent sidewise shifting of the hog house while being loaded, carried, and unloaded. The frame braces 25 provide stops which prevent a hog house or the like from shifting forwardly on the frame 11.

In operation, the trailer 8 is backed up by the tractor 9, with the lifting arms 39 at ground level, until the ramps 43 on the arms 39 go under one end of such as a hog house 10 and lift such end and until the arms 39 are at the other end of the hog house. The arms 39 are then elevated to load the hog house onto the arms 39 and the arms 39 are elevated out of contact with the ground 69, by operation of the hydraulic cylinder 64 from the tractor 9. The tractor then pulls the trailer 8 with its load to a new site, whereupon the hog house 10 can be unloaded onto the new site simply by depressing the arms 39 and then moving the tractor 9 forwardly until the arms 39 clear from under the hog house 10.

What is claimed is:

1. In a lifting trailer, a frame comprising laterally spaced longitudinal members, vertical members fixed to and rising from said longitudinal members, a cross member fixed to and extending between said vertical members on a level above said longitudinal members, said longitudinal members having ends remote from said vertical members, ground-engaging wheels on said ends of the longitudinal members, draft means connected to said frame and extending therefrom away from said ground-engaging wheels, means connecting said draft means to said frame to swing on a horizontal transverse axis relative to said frame, extensible and contractible means pivoted at one end to said frame cross member and at its other end to said draft means, and lifting arm means mounted on said frame to move with the frame and extending toward and beyond said ground-engaging wheels, said extensible and contractible means being operable to tilt the frame relative to said draft means.

2. In a lifting trailer, a frame comprising laterally spaced longitudinal members, vertical members fixed to and rising from said longitudinal members, a cross member fixed to and extending between said vertical members on a level above said longitudinal members, said longitudinal members having ends remote from said vertical members, ground-engaging wheels on said ends of the longitudinal members, draft means connected to said frame and extending therefrom away from said ground-engaging wheels, means connecting said draft means to said frame to swing on a horizontal transverse axis relative to said frame, extensible and contractible means pivoted at one end to said frame cross member and at its other end to said draft means, and lifting arm means mounted on said frame to move with the frame and extending toward and beyond said ground-engaging wheels, said extensible and contractible means being operable to tilt the frame relative to said draft means, said extensible and contractible means comprising a hydraulic jack.

3. In a lifting trailer, a frame comprising laterally spaced longitudinal members, vertical members fixed to and rising from said longitudinal members, a cross member fixed to and extending between said vertical members on a level above said longitudinal members, said longitudinal members having ends remote from said vertical members, ground-engaging wheels on said ends of the longitudinal members, draft means connected to said frame and extending therefrom away from said ground-engaging wheels, means connecting said draft means to said frame to swing on a horizontal transverse axis relative to said frame, extensible and contractible means pivoted at one end to said frame cross member and at its other end to said draft means, and lifting arm means mounted on said frame to move with the frame and extending toward and beyond said ground-engaging wheels, said extensible and contractible means being operable to tilt the frame relative to said draft means, said frame further comprising a stationary shaft extending between and fixed to said vertical frame members on a level below said frame cross member, and said draft means comprising a shaft rotatably circumposed on said stationary shaft, draft arms fixed to said rotatable shaft, and sleeve means on said rotatable shaft to which said lifting arm means are fixed.

4. In a lifting trailer, a frame comprising laterally spaced longitudinal members, vertical members fixed to and rising from said longitudinal members, a cross member fixed to and extending between said vertical members on a level above said longitudinal members, said longitudinal members having ends remote from said vertical members, ground-engaging wheels on said ends of the longitudinal members, draft means connected to said frame and extending therefrom away from said ground-engaging wheels, means connecting said draft means to said frame to swing on a horizontal transverse axis relative to said frame, extensible and contractible means pivoted at one end to said frame cross member and at its other end to said draft means, and lifting arm means mounted on said frame to move with the frame and extending toward and beyond said ground-engaging wheels, said extensible and contractible means being operable to tilt the frame relative to said draft means, said lifting arm means comprising a pair of parallel longitudinal arms having rear ends comprising wedges having upper ramp surfaces.

5. In a lifting trailer, a frame comprising laterally spaced longitudinal members, vertical members fixed to and rising from said longitudinal members, a cross member fixed to and extending between said vertical members on a level above said longitudinal members, said longitudinal members having ends remote from said vertical members, ground-engaging wheels on said ends of the longitudinal members, draft means connected to said frame and extending therefrom away from said ground-engaging wheels, means connecting said draft means to said frame to swing on a horizontal transverse axis relative to said frame, extensible and contractible means pivoted at one end to said frame cross member and at its other end to said draft means, and lifting arm means mounted on said frame to move with the frame and extending toward and beyond said ground-engaging wheels, said extensible and contractible means being operable to tilt the frame relative to said draft means, said frame further comprising a stationary shaft extending between and fixed to said vertical frame members on a level below said frame cross member, and said draft means comprising a shaft rotatably circumposed on said stationary shaft, draft arms fixed to said rotatable shaft, and sleeve means on said rotatable shaft to which said lifting arm means are fixed, said sleeve means comprising sleeves circumposed on said rotatable shaft and slidable therealong, said lifting arm means comprising lifting arms fixed to each of said sleeves, said sleeves being adjustable along the rotatable shaft to change the spacing of the lifting arms relative to each other, and locking means for securing the sleeves in adjusted positions on the rotatable shaft.

References Cited in the file of this patent

UNITED STATES PATENTS

| 2,506,699 | Byrd | May 9, 1950 |
| 2,684,021 | Ratzlaff | July 20, 1954 |